(12) United States Patent
Bennetts et al.

(10) Patent No.: US 6,894,239 B2
(45) Date of Patent: May 17, 2005

(54) FLIP-COVER SENSOR FOR KEYPAD

(75) Inventors: David J. Bennetts, East Sussex (GB);
Robert A. Buckley, London (GB);
Richard Verney, Knaphill (GB)

(73) Assignee: Agere Systems Inc., Allentown, PA (US)

( * ) Notice: Subject to any disclaimer, the term of this patent is extended or adjusted under 35 U.S.C. 154(b) by 0 days.

(21) Appl. No.: 10/370,137

(22) Filed: Feb. 19, 2003

(65) Prior Publication Data

US 2004/0011634 A1 Jan. 22, 2004

(30) Foreign Application Priority Data

Mar. 13, 2002 (EP) .............................................. 2251790

(51) Int. Cl.[7] .............................................. H01H 19/04
(52) U.S. Cl. ........................ 200/333; 379/333; 455/575
(58) Field of Search .......................... 200/333; 379/333, 379/334; 455/575, 90

(56) References Cited

U.S. PATENT DOCUMENTS

| | | | |
|---|---|---|---|
| 5,615,259 A | | 3/1997 | Gilbert |
| 5,673,314 A | * | 9/1997 | Olkoski et al. ........ 379/433.13 |
| 5,710,576 A | * | 1/1998 | Nishiyama et al. ......... 345/169 |
| 5,742,894 A | * | 4/1998 | Jambhekar et al. ...... 455/575.3 |
| 5,848,152 A | | 12/1998 | Slipy et al. |
| 5,919,188 A | * | 7/1999 | Shearon et al. ................ 606/41 |
| 6,023,887 A | * | 2/2000 | Okubo .......................... 49/13 |
| 6,314,183 B1 | | 11/2001 | Pehrsson et al. |
| 6,434,404 B1 | * | 8/2002 | Claxton et al. .......... 455/575.3 |
| 6,542,606 B1 | * | 4/2003 | Lehtinen et al. ....... 379/433.05 |
| 6,573,886 B1 | * | 6/2003 | Lehtinen et al. ............ 345/173 |
| 2002/0022496 A1 | | 2/2002 | Park |

FOREIGN PATENT DOCUMENTS

EP 0 961 459 A2 12/1999

* cited by examiner

Primary Examiner—K. Lee

(57) ABSTRACT

There is disclosed a keypad apparatus and a method for determining the status of a keypad apparatus. In one embodiment, the keypad apparatus includes a keypad having a plurality of keys and a keypad matrix associated with the keypad and having a switch. The keypad apparatus also includes a cover moveable between an open and a closed position. The keypad apparatus still further includes a means for engaging that cooperates with and allows the switch to provide a status indicating a position of the cover.

18 Claims, 2 Drawing Sheets

FLIP-COVER SENSOR FOR KEYPAD

CROSS-REFERENCE TO FOREIGN APPLICATION

This application claims the benefit of EP Patent Application No. 02251790.8 entitled "Flip-Cover Sensor for Keypad," to David J. Bennetts, et al., filed on Mar. 13, 2002, which is incorporated herein by reference.

FIELD OF THE INVENTION

The present invention is directed, in general, to a keypad apparatus having a keypad housing with a flip-cover and, more specifically, to a mobile telephone or a personal digit assistant (PDA) having a flip-cover.

BACKGROUND OF THE INVENTION

While there may be a general desire to minimize the size of mobile telephones, there is a physical restriction in reducing the size due to a need for the ear piece to be positioned proximate the user's ear at the same time as the mouth piece is positioned proximate the user's mouth. This theoretically dictates that the length of the mobile telephone must be a certain minimum size.

It has been recognized that the position of the ear piece and the mouth piece is only critical when the mobile telephone is in use. Based on this, mobile telephones have been developed with a 'flip-cover.' When the mobile telephone is not in use, the flip-cover folds or slides back onto a keypad housing of the mobile telephone and, therefore, does not increase the overall size of the mobile telephone. When a call is to be made or received, the flip-cover is opened such that the length of the mobile telephone becomes longer and the mouthpiece for the user is more practically positioned.

Typically, mobile telephone designs having a flip-cover include a means such that the state of the flip-cover, either open or closed, is detected. The detection of the flip-cover state, for example, may be used for answering a call (on opening the flip-cover) and terminating a call (on closing the flip-cover).

Presently, a sensor switch, such as a micro-switch, may be recessed within the surface of the keypad housing to engage with a switch activator on the cover. The switch activator is usually a small protrusion that extends into a recess of a surface of the mobile telephone when the flip-cover is closed thereby engaging, or activating, the sensor switch. This sensor switch provides an input signal to a general-purpose input/output (GPIO) pin of a micro-controller within the mobile telephone. Thus, the micro-controller within the mobile telephone receives a dedicated signal indicating whether the flip-cover is open or closed.

One disadvantage with this present detection of the flip-cover state is that the provision of extra pins on the micro-controller integrated circuit package increases the cost of the integrated circuit. Therefore, the provision of a dedicated GPIO pin to the micro-controller for the purpose of detecting the status of the flip-cover increases the cost of the micro-controller integrated circuit. Alternatively, using a spare GPIO pin for this purpose prevents it from being used for another purpose.

One proposal for detecting the flip-cover state includes using a switch matrix associated with a keypad of the mobile telephone. A switch of the switch matrix may receive a signal which in an alternate detection process would have been provided to the GPIO pin of the micro-controller. In such a proposal, when the particular switch of the matrix is not pressed, a signal is sent to a keypad controller to indicate that the flip cover is open. The disadvantage with this proposal, however, is that an entire row of the keypad switch matrix is inoperable while the flip cover is open since one of the switches in that row of the switch matrix will be constantly activated. Hence that row is not usable. The proposal, therefore, is not practical since it is unlikely that an entire row of the switch matrix may be unused and still provide a sufficient number of keys for normal operation of the mobile telephone.

Accordingly, what is needed in the art is an improved arrangement for detecting the status of a flip-cover associated with a keypad apparatus, such as a mobile phone, that overcomes the deficiencies in the prior art.

SUMMARY OF THE INVENTION

To address the above-discussed deficiencies of the prior art, the present invention provides a keypad apparatus. In one embodiment, the keypad apparatus (e.g., a mobile phone) includes a keypad having a plurality of keys and a keypad matrix associated with the keypad and having a switch. The keypad apparatus also includes a cover moveable between an open and a closed position. The keypad apparatus still further includes a means for engaging that cooperates with and allows the switch to provide a status indicating a position of the cover. When the cover is in the closed position, the status of the switch corresponds to a key pressed state.

In a preferred embodiment, the means for engaging may include a switch actuator. The switch actuator may be a protrusion on the surface of the cover that engages the switch when the cover is in the closed position. The switch may be recessed in a housing of the keypad.

In another embodiment, at least one of the plurality of keys is preferably uncovered with the cover in the closed position. In yet another embodiment, with the cover in the open position, the status of the switch preferably corresponds to a key unpressed state.

According to the present invention, there is also provided a method for determining the status of a keypad apparatus. In one embodiment, providing a keypad having a plurality of keys and a keypad matrix associated with the keypad and having a switch. The method also includes allowing a cover to move between an open and a closed position and selectively engaging the switch to provide a status indicating a position of the cover. When the cover is in the closed position, the status indicates that the keypad apparatus is in a key pressed state.

The method preferably includes covering at least one of the plurality of keys with the cover in the closed position. The method also preferably includes uncovering at least one of the plurality of keys with the cover in the open position. With the cover in the open position, the status of the switch preferably corresponds to a key unpressed state.

The foregoing has outlined preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention.

BRIEF DESCRIPTION OF THE DRAWINGS

For a more complete understanding of the present invention, reference is now made to the following descriptions taken in conjunction with the accompanying drawings, in which.

DESCRIPTION OF PREFERRED EMBODIMENT

The present invention is described herein with reference to a particular non-limiting example. A person skilled in the art will appreciate that the invention is more generally applicable. In particular, the present invention is described in relation to a mobile telephone. However, the present invention may be more broadly applied to any keypad apparatus and, particularly, to a housing in which a keypad is situated.

Figure 1:
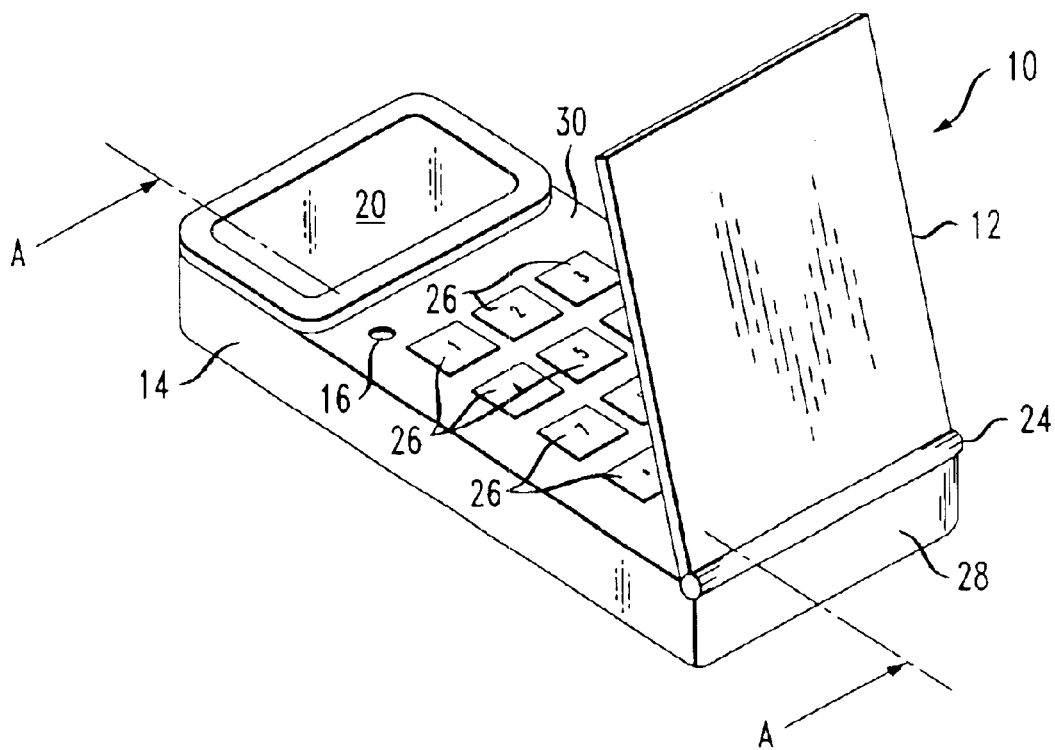
FIG. 1 illustrates a diagram of an embodiment of a mobile telephone constructed in accordance with the principles of the present invention.

Referring initially to FIG. 1, there is illustrated a mobile telephone, generally designated 10, in which the invention may be advantageously utilized. The mobile telephone 10 includes a main housing 14 and a cover 12. The main housing 14 includes a screen 20, and a top surface of the housing 30 within which is provided a plurality of keys 26 collectively forming a keypad. The cover 12 is attached to the main housing 14 by means of a hinge 24 at the junction of the top surface of the housing 30 and a side surface of the housing 28. The cover 12 is movable with respect to the main housing 14 by means of the hinge 24, such that in a closed position the cover 12 rests on a portion of the main housing 14. In an open position, the cover 12 extends beyond the main housing 14, such that in the illustrated embodiment the top surface of the housing 30 upon which the keypad is provided is uncovered. In moving from the closed to open position, the cover 12 moves through approximately 180 degrees. The cover 12 may be a typical flip-cover that is well-known in the art.

Figure 2:
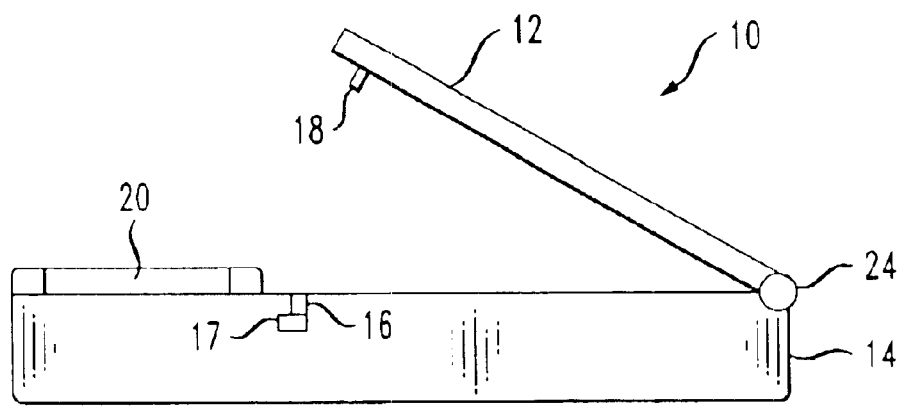
FIG. 2 illustrates a diagram of a view through cross-section A—A of FIG. 1.

As can be seen from FIG. 1, the top surface of the housing 30 may include an opening 16. Referring to FIG. 2, which shows a cross-section through A—A of FIG. 1, the opening 16 is shown to extend into the main housing 14. FIG. 2 also illustrates that the cover 12 includes a protrusion 18 which extends from the surface thereof. The protrusion 18 is shaped such that it engages the opening 16. Thus with the cover 12 closed, the protrusion 18 extends into the opening 16.

As shown in FIG. 2, in the main housing 14 there is provided a switch 17. The protrusion 18 is adapted such that with the cover 12 closed, the protrusion 18 engages the switch 17 to switch or change a state of the switch 17. Thus, if the switch 17 is normally open, the protrusion 18 closes the switch 17 on closing the cover 12. If the switch 17 is normally closed, the protrusion 18 opens the switch 17 on closing the cover 12. The main housing 14, therefore, is provided with a means to engage to indicate the status of the cover 12 by cooperatively engaging with the cover 12.

In accordance with the present invention, the switch 17 comprises a switch of a keypad matrix array, and provides an input signal to a handset micro-controller of the mobile telephone 10 in a similar manner as the plurality of keys 26 of FIG. 1 may provide an input signal. This is further discussed with reference to FIG. 1.

Figure 3:
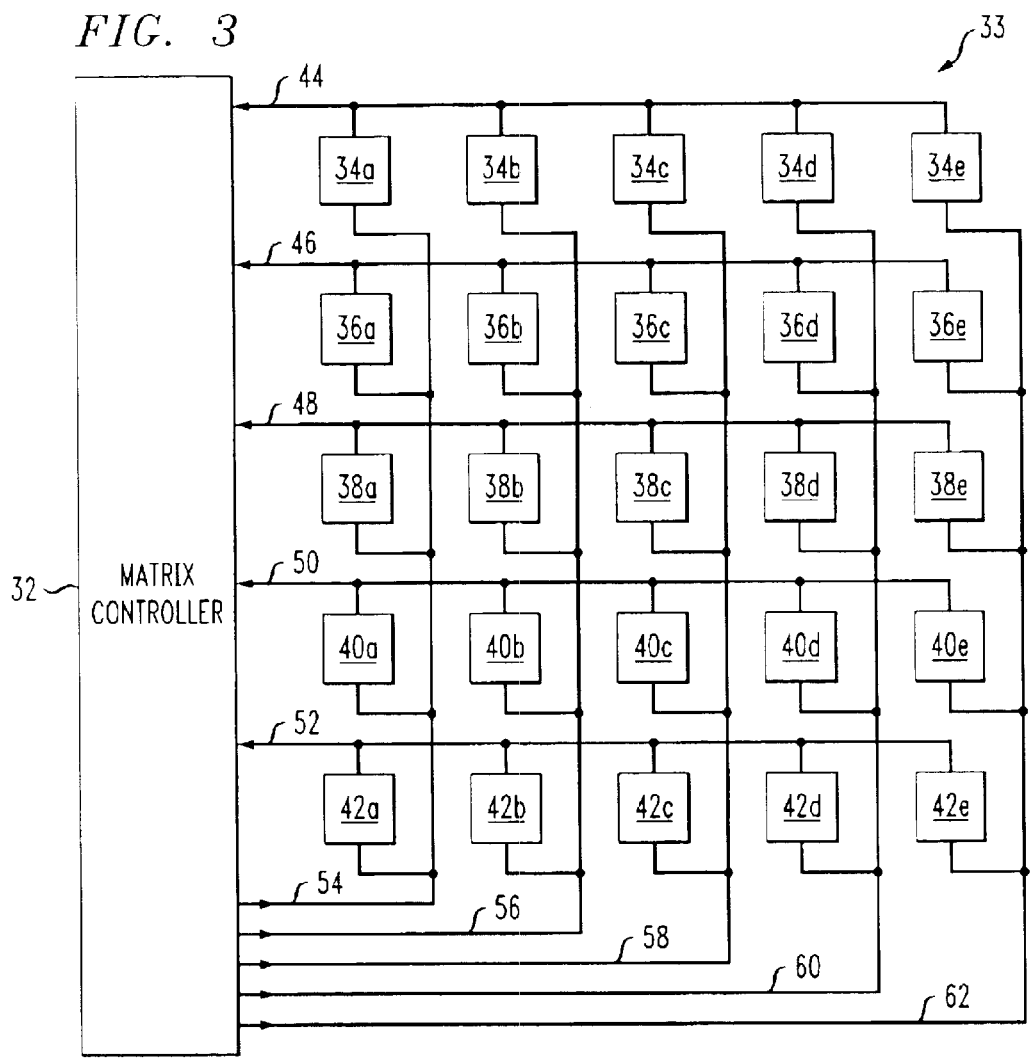
FIG. 3 illustrates a block diagram of an embodiment of an implementation of a matrix array for the mobile telephone of FIG. 1 constructed in accordance with the principles of the present invention.

Referring to FIG. 3, there is illustrated an embodiment of a matrix arrangement, generally designated 33, for processing inputs provided by the plurality of keys 26. The matrix arrangement 33 will be familiar to one skilled in the art, and only the necessary details are discussed herein to understand the prevent invention.

The matrix arrangement 33 is a 5×5 matrix, which allows for 25 keys to be connected thereto. The matrix arrangement 33 comprises a set of 25 switches 34a–42e. Each switch is associated with a key. Pressing a key activates the associated switch. The switches 34a–42e are arranged in five rows 34, 36, 38, 40, 42. Each row has five columns a, b, c, d, e. Each of the switches 34a–42e provides an input on a column line to a matrix controller 32, which may be, for example, a micro-controller of the mobile telephone 10. The switches 34a–34e provide an input to the matrix controller 32 on line 44, the switches 36a–36e provide an input to the matrix controller 32 on line 46, the switches 38a–38e provide an input to the matrix controller 32 on line 48, the switches 40a–40e provide an input to the matrix controller 32 on line 50, and the switches 42a–42e provide an input to the matrix controller 32 on line 52. The matrix controller 32 generates an output to the switches in row a on line 54, to the switches in row b on line 56, to the switches in row c on line 58, to the switches in row d on line 60, and to the switches in row e on line 62.

As is known in the art, responsive to depression of one of the plurality of keys 26, the associated switch of the matrix arrangement 33 is closed. For the purposes of an illustrative example, assume that the switch 38c is closed. Responsive thereto, a signal is generated on line 48 to the matrix controller 32. In order to determine which of the switches in the row 38 has generated such a signal, the matrix controller 32 sequentially applies a signal on column lines 54, 56, 58, 60, 62 and at the same time continues to monitor row line 48. As the switch 38c is closed, the matrix controller 32 sees a change in the signal on line 48 when a signal is applied to line 58, and the matrix controller 32 thereby identifies which switch has been closed. One skilled in the art will understand the operation of the matrix arrangement 33.

In a typical application, the matrix arrangement 33 may have redundant switches. That is, the matrix arrangement 33 may have more switches than are needed to provide for the plurality of keys 26 of the mobile telephone 10. Spare matrix switches, therefore, may be available. For example, the mobile telephone 10 may have a total of 22 keys resulting in three redundant or spare switches in the matrix arrangement 33. One skilled in the art will understand that in view of the matrix arrangement 33, the spare switches may be provided even though they are redundant.

In accordance with the preferred embodiment of the present invention, one of the spare switches of the matrix arrangement 33 may be utilized as the switch 17 of FIG. 2 for detecting the status of the cover 12. For example, assuming switches 42c, 42d, 42e are spare switches, then the switch 42e may be allocated for use as the switch 17 of FIG. 2. When the switch 42e is closed (or opened depending on the configuration of the switches), the closing of the cover 12 is detected directly by the matrix controller 32 using conventional inputs and outputs as shown in FIG. 3. Similarly the opening of the cover 12 from a closed position may also be detected. Thus the matrix controller 32 does not require any additional input/output pins in order to detect the status of the cover 12.

In FIGS. 1 and 2, the cover 12 covers all of the plurality of keys 26 while in other embodiments this may not be the case. The cover 12, for example, may cover a selected number of the plurality of keys 26 (e.g., the volume keys may be uncovered). The cover 12 may also cover none of the plurality of keys 26 since the purpose of the cover 12 may be to reduce the overall size of the mobile telephone 10 when not receiving or making a telephone call. For example, there may be a desired application where the cover 12 does not cover any of the plurality of keys 26 when a user enters numbers into memory of the mobile telephone 10 which does not require setting up an active call. In these instances, the location of the opening 16 will be positioned appropriately in order to ensure appropriate engagement with the cover 12 on closing.

Figure 4:
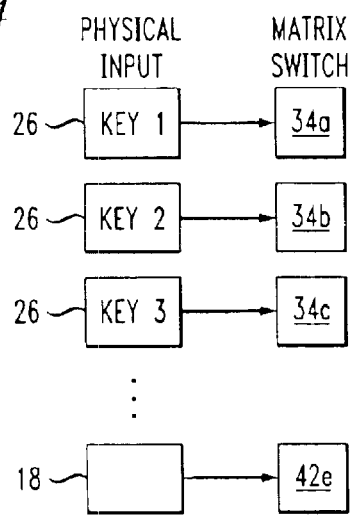
FIG. 4 illustrates a block diagram of an embodiment of the mapping of external inputs of the mobile telephone to the keypad matrix of FIG. 3, constructed in accordance with the principles of the present invention.

Turning now to FIG. 4, illustrated is a block diagram of an embodiment of a mapping of external inputs of the mobile telephone 10. FIG. 4 illustrates some of the plurality of keys 26 mapped to various switches of the matrix arrangement 33 of FIG. 3. In addition, FIG. 4 illustrates the protrusion 18 mapped to the switch 42e of the matrix arrangement 33.

According to FIG. 4, the mobile telephone 10 may operate as follows. When the cover 12 is open, then the switch 42e is not engaged by the protrusion 18 and the switch 42e is an "unpressed key" from the perspective of the matrix controller 32. When the cover 12 is closed, then the switch 42e is engaged by the protrusion 18 and the switch 42e is a "pressed key" from the perspective of the matrix controller 32.

The status of the cover 12, therefore, may be incorporated as part of the matrix arrangement 33. The 'open' status of the cover 12 may be determined by a "key unpressed" state whereas the 'closed' status of the cover 10 may be determined by a "key pressed" state. The "key pressed" state means that the row of the switch matrix is unusable. However, this does not matter if all the keys of that row are covered by the closed cover 12 or if any other switches of the matrix arrangement 33 associated with that row are unused. The number and identifications of the plurality of keys 26 covered on detection of closure of the cover 12 may be determined by the matrix controller 32 of the mobile telephone 10 and may depend upon a physical design of the mobile telephone 10.

Although the invention has been described herein with reference to a mobile telephone having a 'flip' cover, the applicability of the present invention is not so limited. The invention may apply equally advantageously, for example, in a keypad apparatus having a keypad with a slide cover. The opening and closing of the slide cover may be detected in the same way as described above regarding the cover 12 of the mobile telephone 10. The present invention, therefore, broadly applies to any device having a keypad with a moveable cover.

Further, inputs to a matrix array of switches to determine the status of a cover may be implemented by alternative means. For example, in an alternative implementation of the present invention, the protrusion 18 on the cover 12 may engage with an actual dedicated key of the plurality of keys 26 rather than the opening 16. In such an alternative implementation, there would preferably need to be a spare key available on the keypad for such use.

The invention has been described herein with reference to particular preferred embodiments. One skilled in the art will appreciate the broader applicability of the present invention, the scope of which is limited only by the attached claims.

What is claimed is:

1. A keypad apparatus, comprising:
   a keypad having a plurality of keys;
   a keypad matrix associated with the keypad and having a switch;
   a cover moveable between an open and a closed position; and
   means for engaging that cooperates with and allows the switch to provide a status indicating a position of the cover.

2. The keypad apparatus according to claim 1 wherein with the cover in the closed position at least one of the plurality of keys is covered.

3. The keypad apparatus according to claim 1 wherein with the cover in the open position at least one of the plurality of keys is uncovered.

4. The keypad apparatus according to claim 1 wherein with the cover in the open position the status corresponds to a key unpressed state.

5. The keypad apparatus according to claim 1 wherein the means for engaging comprises a switch actuator.

6. The keypad apparatus according to claim 5 wherein the switch actuator is a protrusion on the surface of the cover that engages the switch when the cover is in the closed position.

7. The keypad apparatus according to claim 1 wherein the switch is recessed in a housing of the keypad.

8. A method for determining the status of a keypad apparatus, comprising:
   providing a keypad having a plurality of keys;
   further providing keypad matrix associated with the keypad and having a switch;
   allowing a cover to move between an open and a closed position; and
   selectively engaging the switch to provide a status indicating a position of the cover.

9. The method according to claim 8 further comprising covering at least one of the plurality of keys with the cover.

10. The method according to claim 8 further comprising uncovering at least one of the plurality of keys with the cover in the open position.

11. The method according to claim 8 wherein with the cover in the open position the status corresponds to a key unpressed state.

12. The method according to claim 8 wherein the selectively engaging is performed by a protrusion that engages the switch when the cover is in the closed position.

13. The method according to claim 8 wherein the switch is recessed in a housing of the keypad.

14. A keypad apparatus, comprising:
    a housing having a keypad with a plurality of keys;
    a switch of a keypad matrix that is associated with the keypad and recessed within the housing;
    a cover moveable between an open and a closed position; and
    a protrusion that cooperates with and allows the switch to provide a status indicating a position of the cover.

15. The keypad apparatus according to claim 14 wherein with the cover in the closed position at least one of the plurality of keys is covered.

16. The keypad apparatus according to claim 14 wherein with the cover in the open position at least one of the plurality of keys is uncovered.

17. The keypad apparatus according to claim 14 wherein with the cover in the open position the status corresponds to a key unpressed state.

18. The keypad apparatus according to claim 14 wherein the cover is a flip cover.

* * * * *